United States Patent
Chu et al.

(10) Patent No.: US 11,932,714 B2
(45) Date of Patent: Mar. 19, 2024

(54) COPOLYMER, FILM COMPOSITION AND COMPOSITE MATERIAL EMPLOYING THE SAME

(71) Applicant: INDUSTRIAL TECHNOLOGY RESEARCH INSTITUTE, Hsinchu (TW)

(72) Inventors: Yen-Yi Chu, Miaoli (TW); Yun-Ching Lee, Hualien County (TW); Li-Chun Liang, Hsinchu County (TW); Wei-Ta Yang, Taoyuan (TW); Hsiang-Chin Juan, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/871,363

(22) Filed: Jul. 22, 2022

(65) Prior Publication Data
US 2023/0063240 A1 Mar. 2, 2023

Related U.S. Application Data

(60) Provisional application No. 63/224,556, filed on Jul. 22, 2021.

(51) Int. Cl.
| C08F 232/08 | (2006.01) |
| C08F 232/04 | (2006.01) |
| C08F 236/14 | (2006.01) |

(52) U.S. Cl.
CPC .......... *C08F 232/08* (2013.01); *C08F 232/04* (2013.01); *C08F 236/14* (2013.01); *C08F 2800/10* (2013.01); *C08F 2810/20* (2013.01)

(58) Field of Classification Search
CPC .............................. C08F 232/08; C08F 232/04
See application file for complete search history.

(56) References Cited

U.S. PATENT DOCUMENTS

| 4,002,815 | A | 1/1977 | Minchak |
| 4,136,249 | A | 1/1979 | Tenney et al. |
| 7,381,782 | B2 | 6/2008 | Sugawara et al. |
| 10,829,590 | B2 | 11/2020 | Wursche et al. |
| 10,844,164 | B2 | 11/2020 | Yang et al. |
| 2012/0071605 | A1 | 3/2012 | Baugh et al. |
| 2018/0257065 | A1 | 9/2018 | Veige et al. |
| 2020/0230024 | A1 | 7/2020 | Wyler et al. |
| 2020/0276566 | A1 | 9/2020 | Veige et al. |

FOREIGN PATENT DOCUMENTS

| CN | 105985486 A | | 10/2016 | |
| CN | 107417891 A | | 12/2017 | |
| CN | 110615867 A | * | 12/2019 | ............ C08F 232/08 |
| CN | 112679639 A | | 4/2021 | |
| EP | 0 807 998 B1 | | 10/2001 | |
| JP | 4548491 B2 | | 9/2010 | |
| KR | 10-2007-0057748 A | | 6/2007 | |
| TW | 201741362 A | | 12/2017 | |

OTHER PUBLICATIONS

Machine translation of CN 110615867A. (Year: 2019).*
"Molecular Weight and The Effects on Polymer Properties," Amco Polymers (2018). (Year: 2018).*

(Continued)

*Primary Examiner* — Catherine S Branch
(74) *Attorney, Agent, or Firm* — Birch, Stewart, Kolasch & Birch, LLP

(57) ABSTRACT

A copolymer, a film composition and a composite material employing the same are provided. The copolymer is a copolymerization product of a composition, wherein the composition includes a monomer (a), a monomer (b) and a monomer (c). The monomer (a) is a compound having a structure represented by Formula (I), the monomer (b) is a compound having a structure represented by Formula (II), and the monomer (c) is a compound having a structure represented by Formula (III)

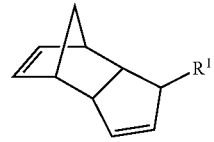

Formula (I)

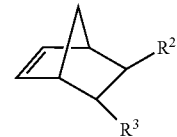

Formula (II)

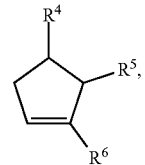

Formula (III)

wherein $R^1$, $R^2$, $R^3$, $R^4$, $R^5$ and $R^6$ are as defined in specification.

12 Claims, No Drawings

(56) References Cited

OTHER PUBLICATIONS

Kim et al., "Exploration of the versatility of ring opening metathesis polymerization: an approach for gaining access to low density polymeric aerogels," RSC Advances, vol. 2, 2012, pp. 8672-8680.
Nikovia et al., "Statistical Ring Opening Metathesis Copolymerization of Norbornene and Cyclopentene by Grubbs' 1st-Generation Catalyst," Molecules, vol. 20, 2015, pp. 15597-15615.
Yao et al., "Ring-Opening Metathesis Copolymerization of Dicyclopentadiene and Cyclopentene Through Reaction Injection Molding Process," Journal of Applied Polymer Science, 2012, pp. 2489-2493.
Chinese Office Action and Search Report for Chinese Application No. 202210870056.7, dated Aug. 8, 2023.
Taiwanese Office Action and Search Report for Taiwanese Application No. 111127483, dated Oct. 13, 2023.

* cited by examiner

COPOLYMER, FILM COMPOSITION AND COMPOSITE MATERIAL EMPLOYING THE SAME

CROSS REFERENCE TO RELATED APPLICATIONS

This application claims the benefit of U.S. Provisional Application No. 63/224,556, filed on Jul. 22, 2021, which is hereby incorporated herein by reference.

TECHNICAL FIELD

The disclosure relates to a copolymer, a film composition and a composite material employing the same.

BACKGROUND

The modern electronic products are trending toward smaller sizes, lighter weight, higher operating speeds, lower time delays and higher-frequency transmission, and the distribution for printed circuit boards is toward high-density. Therefore, the requirements of the characteristics of circuit board materials are becoming more and more strict. Circuit board materials with low k dielectric constant (Dk), low dispersion factor (Df) and good processability are urgently required.

SUMMARY

The disclosure provides a copolymer. According to embodiments of the disclosure, the copolymer may be a reaction product of a composition via copolymerization, wherein the composition includes a monomer (a), a monomer (b) and a monomer (c). The monomer (a) may be a compound having a structure of Formula (I), the monomer (b) may be a compound having a structure of Formula (II), and the monomer (c) may be a compound having a structure of Formula (III)

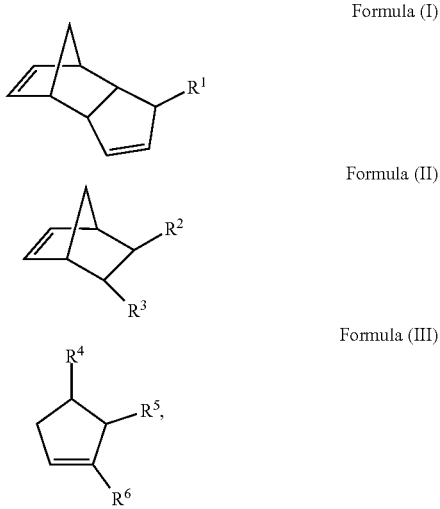

Formula (I)

Formula (II)

Formula (III)

wherein $R^1$ may be hydrogen, chlorine, fluorine hydroxyl group, cyano group, amino group, $C_{1-6}$ alkyl group, $C_{1-6}$ fluoroalkyl group, $C_{1-6}$ alkoxy group, $C_{1-6}$ alkylamino group, $C_{1-6}$ aminoalkyl group, thiol group, $C_{1-6}$ alkylthio group, $C_{1-6}$ thioalkyl group, $C_{1-6}$ alkylsulfonyl group, $C_{1-6}$ alkoxysulfonyl group, $C_{2-6}$ alkanoyl group, $C_{2-6}$ alkanoyloxy group, $C_{2-6}$ alkoxycarbonyl group, or $C_{6-12}$ aryl group; $R^2$ and $R^3$ may be independently hydrogen, chlorine, fluorine hydroxyl group, formyl group, acrylate group, methacrylate group, cyano group, isocyanate group, amino group, $C_{1-6}$ alkyl group, $C_{4-8}$ cycloalkyl group, $C_{1-6}$ fluoroalkyl group, $C_{2-6}$ alkenyl group, $C_{5-8}$ cycloalkenyl group, $C_{2-6}$ alkynyl group, $C_{1-6}$ alkoxy group, $C_{1-6}$ alkylol group, $C_{2-6}$ alkoxyalkyl group, $C_{1-6}$ alkylamino group, $C_{1-6}$ aminoalkyl group, $C_{2-6}$ alkanoyl group, $C_{2-6}$ alkanoyloxy group, $C_{2-6}$ alkoxycarbonyl group, carbamoyl group, $C_{2-7}$ alkylcarbamoyl group, $C_{1-9}$ silyl group, $C_{1-9}$ siloxy group, or $C_{6-12}$ aryl group; $R^4$ may be hydrogen, chlorine, fluorine hydroxyl group, $C_{1-6}$ alkyl group, $C_{1-6}$ fluoroalkyl group, $C_{2-6}$ alkenyl group, $C_{1-6}$ alkylamino group, $C_{1-6}$ aminoalkyl group, carbamoyl group, or $C_{2-7}$ alkylcarbamoyl group; $R^5$ may be hydrogen, chlorine, fluorine hydroxyl group, $C_{1-6}$ alkyl group, $C_{1-6}$ fluoroalkyl group, $C_{2-6}$ alkenyl group, $C_{1-6}$ alkylamino group, $C_{1-6}$ aminoalkyl group, carbamoyl group, $C_{2-7}$ alkylcarbamoyl group, $C_{2-6}$ alkanoyl group, $C_{2-6}$ alkanoyloxy group, $C_{2-6}$ alkoxycarbonyl group, $C_{1-9}$ silyl group, $C_{1-9}$ siloxy group, or $C_{6-12}$ aryl group; and, $R^6$ may be hydrogen, chlorine, fluorine cyano group, $C_{1-6}$ alkyl group, $C_{1-6}$ fluoroalkyl group, $C_{2-6}$ alkenyl group, $C_{1-6}$ alkylamino group, $C_{1-6}$ aminoalkyl group, carbamoyl group, $C_{2-7}$ alkylcarbamoyl group, $C_{2-6}$ alkanoyl group, $C_{2-6}$ alkanoyloxy group, $C_{2-6}$ alkoxycarbonyl group, $C_{1-9}$ silyl group, $C_{1-9}$ siloxy group, or $C_{6-12}$ aryl group.

According to embodiments of the disclosure, the disclosure also provides a thin film composition including the aforementioned copolymer. According to embodiments of the disclosure, in addition to the copolymer, the thin film composition can include a cross-linking agent, a resin, or a combination thereof. When the thin film composition includes the copolymer and the cross-linking agent, the weight ratio of the copolymer to the cross-linking agent is 99:1 to 1:99. In addition, when the thin film composition includes the copolymer and the resin, the weight ratio of the copolymer to the resin is 1:99 to 99:1. Furthermore, when the thin film composition includes the copolymer, cross-linking agent, and resin, the weight ratio of the copolymer to the cross-linking agent is 9:1 to 3:7, and the weight ratio of the copolymer to the resin is 1:99 to 99:1.

According to embodiments of the disclosure, the disclosure also provides a composite material. The composite material can include a cured product or semi-cured product of the thin film composition, and a substrate. In particular, the cured product or semi-cured product may be disposed on the substrate or disposed within the substrate.

A detailed description is given in the following embodiments.

DETAILED DESCRIPTION

The copolymer, film composition and composite material employing the same of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. As used herein, the term "about"

in quantitative terms refers to plus or minus an amount that is general and reasonable to persons skilled in the art. As used herein, the term "about" in quantitative terms refers to plus or minus an amount that is general and reasonable to persons skilled in the art.

The disclosure provides a copolymer, a thin film composition and composite material employing the same. The disclosure develops a novel copolymer via chemical structure design. In detail, a crosslinkable copolymer is prepared by reacting a dicyclopentadiene-based compound with a norbornene-based compound and a cyclopentene-based compound (serving as monomers) to undergo a polymerization. In the preparation of copolymer, due to the moderate copolymerization rate, the molecular weight of the copolymer may be easily controlled so that copolymers within a specific molecular weight range may be obtained. The chemical structure of the copolymer of the disclosure has crosslinkable functional groups and is suitable for use in concert with various resin or cross-linking agents to form a composition with excellent dielectric properties (lower dielectric constant (Dk) (less than or equal to 2.60 (at 10 GHz)) and dissipation factor (Df) (less than or equal to 0.0026 (at 10 GHz))), serving as the substrate material. The disclosure provides a thin film composition including the copolymer and a composite material including a cured product or semi-cured product (such as a composite of B-stage resin prepreg).

According to embodiments of the disclosure, the copolymer may be a reaction product of a composition via copolymerization, wherein the composition includes a monomer (a), a monomer (b) and a monomer (c). The monomer (a) may be a compound having a structure represented by Formula (I), the monomer (b) may be a compound having a structure represented by Formula (II), and the monomer (c) may be a compound having a structure represented by Formula (III)

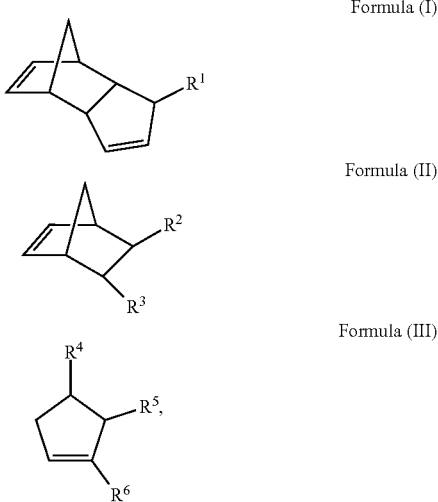

Formula (I)

Formula (II)

Formula (III)

wherein $R^1$ may be hydrogen, chlorine, fluorine hydroxyl group, cyano group, amino group, $C_{1-6}$ alkyl group, $C_{1-6}$ fluoroalkyl group, $C_{1-6}$ alkoxy group, $C_{1-6}$ alkylamino group, $C_{1-6}$ aminoalkyl group, thiol group, $C_{1-6}$ alkylthio group, $C_{1-6}$ thioalkyl group, $C_{1-6}$ alkylsulfonyl group, $C_{1-6}$ alkoxysulfonyl group, $C_{2-6}$ alkanoyl group, $C_{2-6}$ alkanoyloxy group, $C_{2-6}$ alkoxycarbonyl group, or $C_{6-12}$ aryl group; $R^2$ and $R^3$ may be independently hydrogen, chlorine, fluorine hydroxyl group, formyl group, acrylate group, methacrylate group, cyano group, isocyanate group, amino group, $C_{1-6}$ alkyl group, $C_{4-8}$ cycloalkyl group, $C_{1-6}$ fluoroalkyl group, $C_{2-6}$ alkenyl group, $C_{5-8}$ cycloalkenyl group, $C_{2-6}$ alkynyl group, $C_{1-6}$ alkoxy group, $C_{1-6}$ alkylol group, $C_{2-6}$ alkoxyalkyl group, $C_{1-6}$ alkylamino group, $C_{1-6}$ aminoalkyl group, $C_{2-6}$ alkanoyl group, $C_{2-6}$ alkanoyloxy group, $C_{2-6}$ alkoxycarbonyl group, carbamoyl group, $C_{2-7}$ alkylcarbamoyl group, $C_{1-9}$ silyl group, $C_{1-9}$ siloxy group, or $C_{6-12}$ aryl group; $R^4$ may be hydrogen, chlorine, fluorine hydroxyl group, $C_{1-6}$ alkyl group, $C_{1-6}$ fluoroalkyl group, $C_{2-6}$ alkenyl group, $C_{1-6}$ alkylamino group, $C_{1-6}$ aminoalkyl group, carbamoyl group, or $C_{2-7}$ alkylcarbamoyl group; $R^5$ may be hydrogen, chlorine, fluorine hydroxyl group, $C_{1-6}$ alkyl group, $C_{1-6}$ fluoroalkyl group, $C_{2-6}$ alkenyl group, $C_{1-6}$ alkylamino group, $C_{1-6}$ aminoalkyl group, carbamoyl group, $C_{2-7}$ alkylcarbamoyl group, $C_{2-6}$ alkanoyl group, $C_{2-6}$ alkanoyloxy group, $C_{2-6}$ alkoxycarbonyl group, $C_{1-9}$ silyl group, $C_{1-9}$ siloxy group, or $C_{6-12}$ aryl group; and, $R^6$ may be hydrogen, chlorine, fluorine cyano group, $C_{1-6}$ alkyl group, $C_{1-6}$ fluoroalkyl group, $C_{2-6}$ alkenyl alkylamino group, $C_{1-6}$ aminoalkyl group, carbamoyl group, $C_{2-7}$ group, $C_{1-6}$ alkylcarbamoyl group, $C_{2-6}$ alkanoyl group, $C_{2-6}$ alkanoyloxy group, $C_{2-6}$ alkoxycarbonyl group, $C_{1-9}$ silyl group, $C_{1-9}$ siloxy group, or $C_{6-12}$ aryl group.

According to embodiments of the disclosure, $C_{1-6}$ alkyl group may be linear or branched alkyl group. For example, $C_{1-6}$ alkyl group may be methyl, ethyl, propyl, butyl, pentyl, hexyl, or an isomer thereof. According to embodiments of the disclosure, $C_{1-6}$ fluoroalkyl group may be an alkyl group which a part of or all hydrogen atoms bonded on the carbon atom are replaced with fluoride atoms, and $C_{1-6}$ fluoroalkyl group may be linear or branched fluoroalkyl group. For example, fluoromethyl may be monofluoromethyl group, difluoromethyl group, or perfluoromethyl group. According to embodiments of the disclosure, $C_{1-6}$ fluoroalkyl group of the disclosure may be fluoromethyl, fluoroethyl, fluoropropyl, fluorobutyl, fluoropentyl, fluorohexyl, or an isomer thereof. According to embodiments of the disclosure, $C_{2-6}$ alkenyl may be linear or branched alkenyl. For example, $C_{2-6}$ alkenyl may be vinyl, propenyl, butenyl, pentenyl, hexenyl, or an isomer thereof. According to embodiments of the disclosure, $C_{1-6}$ alkoxy group may be linear or branched alkoxy group. For example, $C_{1-6}$ alkoxy group may be methoxy, ethoxy, propoxy, butoxy, pentoxy, hexoxy, or an isomer thereof. According to embodiments of the disclosure, $C_{1-6}$ alkylol group may be linear or branched alkylol group. For example, $C_{1-6}$ alkylol group may be methylol, ethylol, propylol, butylol, or an isomer thereof. According to embodiments of the disclosure, $C_{2-6}$ alkoxyalkyl group may be linear or branched alkoxyalkyl group. For example, $C_{2-6}$ alkoxyalkyl group may be methoxymethyl, ethoxymethyl, methoxyethyl, propoxymethyl, or an isomer thereof. According to embodiments of the disclosure, $C_{1-6}$ alkylamino group may be secondary or tertiary alkylamino group. For example, $C_{1-6}$ alkylamino group may be methylamino group (—NH—CH$_3$), dimethylamino group (—N(CH$_3$)$_2$), or diethylamino group (—N(CH$_2$CH$_3$)$_2$). According to embodiments of the disclosure, $C_{1-6}$ aminoalkyl group may be primary, secondary or tertiary aminoalkyl group. For example, $C_{1-6}$ aminoalkyl group may be aminomethyl (—CH$_2$—NH$_2$), methylaminomethyl (—CH$_2$—NH(CH$_3$)), or dimethylaminomethyl (—CH$_2$—N(CH$_3$)$_2$). According to embodiments of the disclosure, $C_{2-6}$ alkanoyl may be linear or branched alkanoyl. For example, $C_{2-6}$ alkanoyl may be acetyl, propionyl, or butyryl. According to embodiments of the disclosure, $C_{2-6}$ alkanoyloxy may be linear or branched alkanoyloxy. For example, $C_{2-6}$ alkanoyloxy may be acetyloxy, propionyloxy, or butyryloxy. According to embodiments of the disclosure, $C_{2-6}$ alkoxycarbonyl group may be linear or branched alkoxycarbonyl group. For example, $C_{2-6}$ alkoxycarbonyl group may be methoxycarbonyl, ethoxycarbonyl, or propoxycarbonyl. According to embodiments of the disclosure, $C_{2-7}$ alkyl carbamoyl group may be methylcarbamoyl, dimethylcarbamoyl, diethylcarbamoyl, or dipropylcarbamoyl. According to embodiments of the disclosure, $C_{1-9}$ silyl group may be trimethylsilyl, trimethylsilyl, or trimethylsilyl. According to embodiments of the disclosure, $C_{1-9}$ siloxy group may be trimethylsilyl, trimethylsilyl, or trimethylsilyl. According to embodiments of the disclosure, $C_{6-12}$ aryl group may be phenyl group, biphenyl group, or naphthyl group.

According to embodiments of the disclosure, the molar ratio of the monomer (a) to the monomer (b) and the monomer (c) may be about 0.5:99.5 to 99:1, such as about 1:99, 2:98, 3:97, 4:96, 5:95, 6:94, 7:93, 8:92, 9:91, 1:9, 2:8, 3:7, 4:6, 5:5, 6:4, 7:3, 8:2, 9:1, 91:9, 92:8, 93:7, 94:6, 95:5, 96:4, 97:3, or 98:2. According to embodiments of the disclosure, the molar ratio of the monomer (b) to the monomer (c) may be about 1:99 to 99:1, such as about 2:98, 3:97, 4:96, 5:95, 6:94, 7:93, 8:92, 9:91, 1:9, 2:8, 3:7, 4:6, 5:5, 6:4, 7:3, 8:2, 9:1, 91:9, 92:8, 93:7, 94:6, 95:5, 96:4, 97:3, or 98:2. When the copolymer is prepared by merely reacting the monomer (b) (norbornene-based compound) with the monomer (c) (cyclopentene-based compound) to undergo a copolymerization (or the amount of monomer (a) (dicyclopentadiene-based compound) for preparing the copolymer is too low), the obtained copolymer has a lower reactivity. When the copolymer is prepared by merely reacting the monomer (a) (dicyclopentadiene-based compound) and monomer (c) (cyclopentene-based compound) to undergo a copolymerization (or the amount of monomer (b) (norbornene-based compound) for preparing the copolymer is too low), the obtained copolymer has a lower reactivity. When the copolymer is prepared by merely reacting the monomer (a) (dicyclopentadiene-based compound) and monomer (b) (norbornene-based compound) to undergo a copolymerization (or the amount of monomer (c) (cyclopentene-based compound) for preparing the copolymer is too low), the obtained copolymer has a lower reactivity.

According to embodiments of the disclosure, the number average molecular weight (Mn) of the copolymer may be about 500 (g/mol) to 100,000 (g/mol), such as about 1,000 (g/mol), 2,000 (g/mol), 3,000 (g/mol), 5,000 (g/mol), 10,000 (g/mol), 20,000 (g/mol), 30,000 (g/mol), 40,000 (g/mol), 50,000 (g/mol), 60,000 (g/mol), 80,000 (g/mol), or 90,000 (g/mol). The number average molecular weight (Mn) of the copolymer of the disclosure may be determined by gel permeation chromatography (GPC) based on a polystyrene calibration curve. According to embodiments of the disclosure, the copolymer has a significant solubility in organic solvent.

According to embodiments of the disclosure, the monomer (a) may be dicyclopentadiene compound; the monomer (b) may be norbornene, 5-vinyl-2-norbornene, 5-methylidene-2-norbornene, 5-ethylidene-2-norbornene, or a combination thereof; and, the monomer (c) may be cyclopentene, 1-methylcyclopentene, 3-methylcyclopentene, 1-chlorocyclopentene, 3-chlorocyclopentene, or a combination thereof.

According to embodiments of the disclosure, the exothermic amount of copolymer in the range from 40° C. to 280° C. may be greater than or equal to about 100 J/g (such as between 100 J/g and 700 J/g, between 100 J/g and 650 J/g, 100 J/g and 600 J/g, 150 J/g and 700 J/g, 150 J/g and 650 J/g, 200 J/g and 700 J/g, or 200 J/g and 650 J/g), wherein the exothermic amount is determined by differential scanning calorimetry (DSC) with a differential scanning calorimeter (commercially available from TA Instruments under the trade designation of Q2000) with a heating rate of 20° C./minutes. The exothermic amount of copolymer in the range from 40° C. to 280° C. is directly proportional to the reactivity of the copolymer. Therefore, when the copolymer of the disclosure is further blended with various resin or cross-linking agents to prepare a thin film composition, due to the excellent reactivity of the copolymer, the amount of copolymer in the thin film composition may be adjustable and the cross-linking temperature of the thin film composition may be further reduced.

According to embodiments of the disclosure, the polydispersity index (PDI) of the copolymer may be about 1.0 to 3.5, such as about 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, or 3.4.

According to embodiments of the disclosure, the composition for preparing the copolymer does not contain further monomers apart from the monomer (a), monomer (b) and monomer (c). Herein, the term "monomer" means a compound which can convert into a repeating unit of the copolymer via copolymerization. According to embodiments of the disclosure, the composition may consist of the monomer (a), monomer (b) and monomer (c). According to embodiments of the disclosure, in addition to the monomer (a), monomer (b) and monomer (c), the composition can further include an alpha-olefin for controlling the molecular weight of the copolymer. According to embodiments of the disclosure, the composition may consist of the monomer (a), monomer (b) and monomer (c), and the alpha-olefin. According to embodiments of the disclosure, the alpha-olefin may have a molar percentage of about 0.1 mol % to 80 mol %, such as about 0.5 mol %, 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, 20 mol %, 25 mol %, 30 mol %, 35 mol %, 40 mol %, 45 mol %, 50 mol %, 55 mol %, 60 mol %, 65 mol %, 70 mol %, or 75 mol %, based on the total moles of the monomer (a), monomer (b), and monomer (c). According to embodiments of the disclosure, the alpha-olefin may be a molecular weight controller. Herein, the amount of the alpha-olefin is inversely proportional to the molecular weight of the copolymer so that the molecular weight of the copolymer may be controlled by the amount of the introduced alpha-olefin.

According to embodiments of the disclosure, the alpha-olefin may be

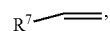

wherein $R^7$ may be $C_{1-10}$ alkyl group, $C_{1-10}$ fluoroalkyl group, $C_{3-10}$ alkenyl group, $C_{6-12}$ aryl group, $C_{6-12}$ arylalkyl group, $C_{5-12}$ cycloalkyl group, $C_{6-12}$ cycloalkylalkyl group, $C_{2-6}$ alkanoyl group, $C_{2-6}$ alkanoyloxy group, or $C_{2-6}$ alkoxycarbonyl group. According to embodiments of the disclosure, $C_{1-10}$ alkyl group may be linear or branched alkyl group. For example, $C_{1-10}$ alkyl group may be methyl, ethyl, propyl, butyl, pentyl, hexyl, or an isomer thereof. According to embodiments of the disclosure, $C_{1-10}$ fluoroalkyl group may be an alkyl group which a part of or all hydrogen atoms bonded on the carbon atom are replaced with fluoride atoms, and $C_{1-6}$ fluoroalkyl group may be linear or branched fluoroalkyl group. For example, fluoromethyl may be monofluoromethyl group, difluoromethyl group, or perfluoromethyl group. According to embodiments of the disclosure, $C_{1-10}$ fluoroalkyl group of the disclosure may be fluoromethyl, fluoroethyl, fluoropropyl, fluorobutyl, fluoropentyl, fluorohexyl, or an isomer thereof. According to embodiments of the disclosure, $C_{3-10}$ alkenyl may be linear or branched alkenyl. For example, $C_{3-10}$ alkenyl may be vinyl, propenyl, butenyl, pentenyl, hexenyl, heptyl, octyl, or an isomer thereof. According to embodiments of the disclosure, $C_{6-12}$ aryl group may be phenyl, biphenyl, or naphthyl. According to embodiments of the disclosure, $C_{6-12}$ arylalkyl group may be benzyl, or phenethyl. According to embodiments of the disclosure, $C_{5-10}$ cycloalkyl group may be cyclopentyl, cyclohexyl, or cycloheptyl. According to embodiments of the disclosure, $C_{6-12}$ cycloalkylalkyl group may be cyclohexylmethyl or cyclohexylethyl. According to embodiments of the disclosure, $C_{2-6}$ alkanoyl may be linear or branched alkanoyl. For example, $C_{2-6}$ alkanoyl may be acetyl, propionyl, or butyryl. According to embodiments of the disclosure, $C_{2-6}$ alkanoyloxy may be linear or branched alkanoyloxy. For example, $C_{2-6}$ alkanoyloxy may be acetyloxy, propionyloxy, or butyryloxy. According to embodiments of the disclosure, $C_{2-6}$ alkoxycarbonyl group may be linear or branched alkoxycarbonyl group. For example, $C_{2-6}$ alkoxycarbonyl group may be methoxycarbonyl, ethoxycarbonyl, or propoxycarbonyl.

For example, alpha-olefin may be

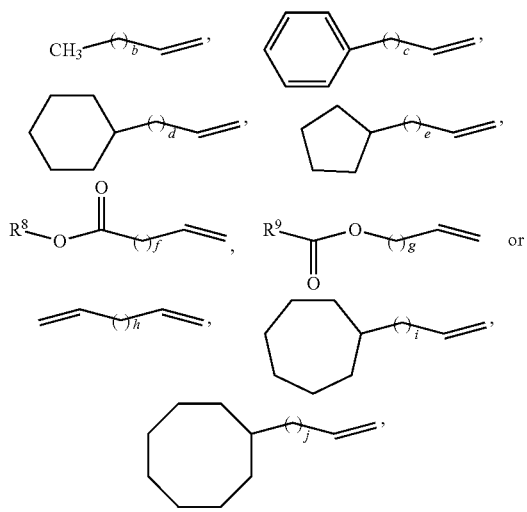

wherein b may be 0, 1, 2, 3, 4, 5, 6, 7, 8, or 9; c may be 0, 1, 2, 3, 4, 5, or 6; d may be 0, 1, 2, 3, 4, 5, or 6; e may be 0, 1, 2, 3, 4, 5, 6, or 7; f may be 0, 1, 2, 3, or 4; $R^8$ may be $C_{1-5}$ alkyl group; g may be 0, 1, 2, 3, or 4; $R^9$ may be $C_{1-5}$ alkyl group; h may be 0, 1, 2, 3, 4, 5, 6, 7, or 8; i may be 0, 1, 2, 3, 4, or 5; and, j may be 0, 1, 2, 3, or 4.

According to embodiments of the disclosure, in addition to the monomer (a), monomer (b) and monomer (c), the composition can further include a metal catalyst to facilitate ring-opening metathesis polymerization (ROMP), thereby increasing the copolymerization rate of the monomer (a), monomer (b) and monomer (c). Accordingly, the molecular weight of the copolymer of the disclosure can also be controlled by the amount of the metal catalyst. According to embodiments of the disclosure, in addition to the monomer (a), monomer (b), monomer (c), and alpha-olefin, the composition may further include a metal catalyst. According to embodiments of the disclosure, the composition can consist of the monomer (a), monomer (b), monomer (c), alpha-olefin, and metal catalyst. According to embodiments of the disclosure, the amount of the metal catalyst may be 0.001 mol % to 5 mol %, such as about 0.002 mol %, 0.005 mol %, 0.02 mol %, 0.05 mol %, 0.07 mol %, 0.1 mol %, 0.15 mol %, 0.2 mol %, 0.3 mol %, 0.5 mol %, 0.7 mol %, 0.9 mol %, 1 mol %, 2 mol %, 3 mol %, 4 mol %, or 4.5 mol %, based on the total mole of the monomer (a), monomer (b), and monomer (c). the metal catalyst may be Grubbs catalyst, such as Grubbs catalyst $1^{st}$ Generation, Grubbs catalyst $2^{nd}$ Generation, Hoveyda-Grubbs catalyst and derivatives thereof, or a composition including at least one of the aforementioned Grubbs catalyst.

According to embodiments of the disclosure, in addition to the monomer (a), monomer (b), monomer (c), alpha-olefin, and metal catalyst, the composition for preparing the copolymer of the disclosure can further include initiator, photoredox mediator, or a combination thereof. According to embodiments of the disclosure, the initiator may be vinyl ether, 1-methoxy-4-phenyl butene, 2-cyclohexyl-1-methoxyethylene, or a combination thereof. According to embodiments of the disclosure, the photoredox mediator may be pyrylium salt, acridinium salt, or a combination thereof. According to embodiments of the disclosure, the amount of the initiator and/or photoredox mediator may be 0.01 mol % to 2 mol %, such as about 0.02 mol %, 0.05 mol %, 0.07 mol %, 0.1 mol %, 0.15 mol %, 0.2 mol %, 0.3 mol %, 0.5 mol %, 0.7 mol %, 0.9 mol %, 1 mol %, or 1.5 mol %, based on the total moles of the monomer (a), monomer (b) and monomer (c).

According to embodiments of the disclosure, the method for preparing the copolymer of the disclosure can include mixing the monomer (a), monomer (b), and monomer (c) to undergo a copolymerization, thereby obtaining the copolymer. According to embodiments of the disclosure, the method for preparing the copolymer of the disclosure can include mixing the monomer (a), monomer (b) and monomer (c) and adding the alpha-olefin serving as molecular weight controller (also called polymerization terminator) to undergo a copolymerization, thereby obtaining the copolymer. According to embodiments of the disclosure, the method for preparing the copolymer of the disclosure can include mixing the monomer (a), monomer (b), and monomer (c) in the presence of the metal catalyst to undergo a copolymerization, thereby obtaining the copolymer. According to embodiments of the disclosure, the method for preparing the copolymer of the disclosure can include mixing the monomer (a), monomer (b), and monomer (c) in the presence of the metal catalyst and adding the alpha-olefin serving as molecular weight controller to undergo a copolymerization, thereby obtaining the copolymer. According to embodiments of the disclosure, the method for preparing the copolymer of the disclosure can include mixing the monomer (a), monomer (b), and monomer (c) in the presence of the initiator and/or photoredox mediator to undergo a copolymerization, thereby obtaining the copolymer. According to embodiments of the disclosure, the method for preparing the copolymer of the disclosure can include mixing the monomer (a), monomer (b), and monomer (c) in the presence of the initiator and/or photoredox mediator and adding the alpha-olefin serving as molecular weight controller to undergo a copolymerization, thereby obtaining the copolymer. According to embodiments of the disclosure, the method for preparing the copolymer of the disclosure can include mixing the monomer (a), monomer (b), and monomer (c) in the presence of the metal catalyst, initiator and/or photoredox mediator to undergo a copolymerization, thereby obtaining the copolymer. According to embodiments of the disclosure, the method for preparing the copolymer of the disclosure can include mixing the monomer (a), monomer (b), and monomer (c) in the presence of the metal catalyst, initiator and/or photoredox mediator and adding the alpha-olefin serving as molecular weight controller to undergo a copolymerization, thereby obtaining the copolymer.

In the method for preparing the copolymer of the disclosure, the addition sequence of components is not limited and may be optionally modified by a person of ordinary skill in the field. According to embodiments of the disclosure, a metal catalyst is dissolved in a solvent at first, obtaining a metal-catalyst-containing solution. Next, a solution including the monomer (a), monomer (b), and monomer (c) is mixed with the metal-catalyst-containing solution. According to some embodiments of the disclosure, the alpha-olefin and at least one of monomer (a), monomer (b), and monomer (c) may be dissolved in solvent at first to obtain a solution, and then the solution is mixed with a metal-catalyst-containing solution and the other monomers.

According to embodiments of the disclosure, the disclosure also provides a thin film composition including the aforementioned copolymer, a cross-linking agent and/or a resin. According to embodiments of the disclosure, the thin film composition includes the aforementioned copolymer and a cross-linking agent. According to embodiments of the disclosure, the thin film composition includes the aforementioned copolymer and a resin. According to embodiments of the disclosure, the thin film composition includes the aforementioned copolymer, a cross-linking agent and a resin.

Due to the excellent reactivity and crosslinkable functional group of the copolymer of the disclosure, the copolymer may be blended with various resin or cross-linking agents to form a thin film composition with excellent dielectric properties, serving as the material of substrate.

According to embodiments of the disclosure, the thin film composition includes copolymer and cross-linking agent, and the weight ratio of the copolymer to the cross-linking agent may be about 99:1 to 1:99, such as about 2:98, 3:97, 4:96, 5:95, 6:94, 7:93, 8:92, 9:91, 1:9, 2:8, 3:7, 4:6, 5:5, 6:4, 7:3, 8:2, 9:1, 91:9, 92:8, 93:7, 94:6, 95:5, 96:4, 97:3, or 98:2. According to embodiments of the disclosure, the thin film composition includes copolymer and resin, and the weight ratio of the copolymer to the resin may be about 1:99 to 99:1, such as about 2:98, 3:97, 4:96, 5:95, 6:94, 7:93, 8:92, 9:91, 1:9, 2:8, 3:7, 4:6, 5:5, 6:4, 7:3, 8:2, 9:1, 91:9, 92:8, 93:7, 94:6, 95:5, 96:4, 97:3, or 98:2. According to embodiments of the disclosure, the thin film composition includes copolymer, cross-linking agent, and resin, and the weight ratio of the copolymer to the cross-linking agent is about 9:1 to 3:7 (such as about 8:2, 7:3, 6:4, 5:5, or 4:6), and the weight ratio of the copolymer to the resin is about 1:99 to 99:1 (such as about 2:98, 3:97, 4:96, 5:95, 6:94, 7:93, 8:92, 9:91, 1:9, 2:8, 3:7, 4:6, 5:5, 6:4, 7:3, 8:2, 9:1, 91:9, 92:8, 93:7, 94:6, 95:5, 96:4, 97:3, or 98:2).

According to embodiments of the disclosure, the resin may be polyolefin resin, epoxy resin, cyanate resin, phenol resin, novolac resin, polystyrene resin, styrene-butadiene copolymer resin (such as polystyrene-butadiene-styrene resin), polyamide resin, polyimide resin, maleimide resin, bismaleimide resin, polyphenylene ether resin, or a combination thereof. According to embodiments of the disclosure, the polyolefin resin may be polybutadiene resin, polyalkenamer resin, cycloolefin polymer resin, cycloolefin copolymer resin, or a combination thereof. According to embodiments of the disclosure, the epoxy resin may be bisphenol A epoxy resin, bisphenol F epoxy resin, bisphenol S epoxy resin, novolac epoxy resin, naphthalene-based epoxy resin, anthracene-based epoxy resin, bisphenol A diglycidyl ether epoxy resin (BADGE), ethylene glycol diglycidyl ether epoxy resin, propylene glycol diglycidyl ether epoxy resin (PGDGE), 1,4-butanediol diglycidyl ether epoxy resin (BDDGE), or a combination thereof.

According to embodiments of the disclosure, the number average molecular weight of the resin may be 600 (g/mol) to 2,000,000 (g/mol), such as about 650 (g/mol), 800 (g/mol), 1,000 (g/mol), 1,500 (g/mol), 2,000 (g/mol), 5,000 (g/mol), 8,000 (g/mol), 10,000 (g/mol), 20,000 (g/mol), 30,000 (g/mol), 50,000 (g/mol), 60,000 (g/mol), 80,000 (g/mol), 100,000 (g/mol), 150,000 (g/mol), 200,000 (g/mol), 500,000 (g/mol), 700,000 (g/mol), 1,000,000 (g/mol), 1,500,000 (g/mol), or 1,800,000 (g/mol). The number average molecular weight (Mn) of the resin of the disclosure may be determined by gel permeation chromatography (GPC) based on a polystyrene calibration curve.

According to embodiments of the disclosure, the cross-linking agent of the disclosure may be a compound having at least two crosslinkable functional groups (such as a compound having two crosslinkable functional groups, a compound having three crosslinkable functional groups, a compound having four crosslinkable functional groups, or a compound having five crosslinkable functional groups), wherein each crosslinkable functional group may be $C_{2-5}$ alkenyl group (such as vinyl group, allyl group, butenyl group, 1,3-butanedienyl group, 1-methyl vinyl group, 1-methyl allyl group, 1,1-dimethyl allyl group, 2-methyl allyl group, or 1,2-dimethyl allyl group), methacrylate group, acrylate group, acryloyl group, methacryloyl group, carboxyl group, vinylbenzyl group, epoxypropyl group, epoxypropyl group, oxiranyl group, oxetanyl group, 3,4-epoxycyclohexyl group, or a combination thereof.

According to embodiments of the disclosure, the cross-linking agent may have a number average molecular weight (Mn) less than or equal to 10,000 (g/mol), such as about 50 (g/mol) to 8,000 (g/mol), about 60 (g/mol) to 8,000 (g/mol), about 70 (g/mol) to 6,000 (g/mol), about 80 (g/mol) to 5,000 (g/mol), 90 (g/mol) to 3,000 (g/mol), or about 100 (g/mol) to 5,000 (g/mol). The number average molecular weight (Mn) of the cross-linking agent of the disclosure may be determined by gel permeation chromatography (GPC) based on a polystyrene calibration curve).

According to embodiments of the disclosure, the cross-linking agent can include methacrylate-type agent, such as triethylene glycol dimethacrylate (TiEGDMA), ethylene glycol dimethacrylate (EGDMA), tetraethylene glycol dimethacrylate (TTEGDMA), polyethylene glycol (200)dimethacrylate (PEG200DMA), 1,4-butanediol dimethacrylate (BDDMA), diethylene glycol dimethacrylate (DEGDMA), 1,6-hexanediol dimethacrylate (HDDMA), polyethylene glycol (600)dimethacrylate (PEG600DMA), 1,12-dodecanediol dimethacrylate (DDDDMA), 1,3-butylene glycol dimethacrylate (BGDMA), ethoxylated 3 bisphenol A dimethacrylate (BPA3EODMA), ethoxylated 2 bisphenol A dimethacrylate (BPA2EODMA), trimethylolpropane trimethacrylate (TMPTMA), ethoxylated 10 bisphenol A dimethacrylate (BPA10EODMA), ethoxylated 4 bisphenol A dimethacrylate (BPA4EODMA), alkoxylated pentaerythritol tetramethacrylate (PETTMA), polypropylene glycol monomethacrylate (PPGMA), or tricyclodecanedimethanol dimethacrylate (TCDDMDMA).

According to embodiments of the disclosure, the cross-linking agent can include acrylate-type) agent, such as dipentaerythritol hexaacrylate (DPHA), 1,6-hexanediol diacrylate (HDDA), polyethylene glycol (200)diacrylate (PEG200DA), tetraethylene glycol diacrylate (TTEGDA), triethylene glycol diacrylate (TIEGDA), pentaerythritol tetraacrylate (PETTA), tripropylene glycol diacrylate (TPGDA), polybutadiene diacrylate (PBDDA), 3-methyl 1,5-pentanediol diacrylate (MPDA), polyethylene glycol (400)diacrylate (PEG400DA), ethoxylated 3 bisphenol A diacrylate (BPA3EODA), trimethylolpropane triacrylate (TMPTA), di-trimethylolpropane tetraacrylate (Di-TMPTTA), tris(2-hydroxyethyl) isocyanurate triacrylate (THEICTA), dipentaerythritol pentaacrylate (DPPA), ethoxylated (20) trimethylolpropane triacrylate (TMP20EOTA), pentaerythritol triacrylate (PETIA), ethoxylated 3 trimethylolpropane triacrylate (TMP3EOTA), propoxylated 3 trimethylolpropane triacrylate (TMP3POTA), ethoxylated pentaerythritol tetraacrylate, ethoxylated 6 trimethylolpropane triacrylate (TMP6EOTA), ethoxylated 9 trimethylolpropane triacrylate (TMP9EOTA), dipropylene glycol diacrylate (DPGDA), 1,10 decanediol diacrylate (DDDA), ethoxylated 4 bisphenol A diacrylate (BPA4EODA), ethoxylated 10 bisphenol A diacrylate (BPA10EODA), esterdiol diacrylate (EDDA), polyethylene glycol (600)diacrylate (PEG600DA), alkoxylated diacrylate, tricyclodecanedimethanol diacrylate (TCDDMDA), propoxylated 2 neopentyl glycol diacrylate (PONPGDA), propoxylated 3 glyceryl triacrylate (GPTA), ethoxylated 15 trimethylolpropane triacrylate (TMP15EOTA), or ethoxylated 12 glyceryl triacrylate (G12EOTA).

According to embodiments of the disclosure, the cross-linking agent can include allylic type agent, such as triallyl cyanurate (TAC), triallyl isocyanurate (TAIC), triallylphosphate (TAP), triallyl borate (TAB), trimethallyl isocyanurate (TMAIC), diallylterephthalate (DATP), diallyl carbonate, diallyl maleate, diallyl fumarate, diallyl phosphite, trimethylolpropane diallyl ether, or 1,1,2,2-tetraallyl oxyethane.

According to embodiments of the disclosure, the cross-linking agent can include vinylic type agent, such as bis (vinylphenyl)ethane (BVPE), bis(4-vinylphenyl) methane, 1,4-butadiene, divinylacetylene, divinylbenzene (DVB), divinyl ether, divinyl sulfide, divinyl sulfone, divinyl sulfoxide, 1,3-divinylcyclohexane, 1,3-divinylcyclopentane, 1,5-hexadiene, isoprene, or 1,2,4-trivinyl cyclohexane (TVCH).

According to embodiments of the disclosure, the cross-linking agent of the disclosure may be commercially available, such as Dianal NR series cross-linking agent (commercially available from Mitsubishi Rayon Co., Ltd.), cross-linking agent with a trade number of Photomer 6173 (commercially available from Diamond Shamrock Co., Ltd.), cross-linking agent with a trade number of Viscoat R-264 cross-linking agent (commercially available from Osaka Organic Chemical Industry Ltd.), cross-linking agent with a trade number of KS Resist 106 (commercially available from Osaka Organic Chemical Industry Ltd.), CYCLOMER P series cross-linking agent (commercially available from Daicel Corporation), PLACCEL CF200 series cross-linking agent (commercially available from Daicel Corporation), Ebecryl series cross-linking agent (commercially available from Daicel UCB Co., Ltd.), cross-linking agent with a trade number of Acrycure RD-F8 (commercially available from Nippon Shokubai Co., Ltd.), VISIOMER series cross-linking agent (commercially available from Evonik Performance Materials GmbH), BECKO-PDX series cross-linking agent (commercially available from Cytec Industries), CRYLCOAT series cross-linking agent (commercially available from Cytec Industries Inc.), SETAL series cross-linking agent (commercially available from Nuplex resins), ANCAMIDE series cross-linking agent (commercially available from Air Products, Inc.), or a combination thereof.

According to embodiments of the disclosure, the cross-linking agent can include bismaleimide. The bismaleimide has a structure represented by Formula (IV) or Formula (V)

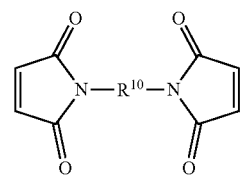

Formula (IV)

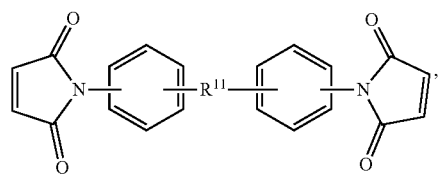

Formula (V)

wherein $R^{10}$ may be —$CR_2$—, —NR—, —$C(O)CH_2$—, —$CH_2OCH_2$—, —$C(O)$—, —O—, —O—O—, —S—, —S—S—, —$S(O)$—, —$CH_2S(O)CH_2$—, —$(O)S(O)$—, —$CH_2(C_6R_4)CH_2$—, —$CH_2(C_6R_4)(O)$—, substituted or non-substituted diphenylene group; may be —$C(R)_2$—, —$C(O)$—, —O—, —O—O—, —S—, —S—S—, —$(O)S(O)$— or —$S(O)$—; and, R are independently hydrogen or $C_{1-4}$ alkyl group. In particular, in the aforementioned group (or moiety), the term "(O)" means a double bond is formed between the oxygen atom and the carbon atom (or sulfur atom). In particular, the term "substituted diphenylene" means at least one hydrogen atom bonded to carbon atoms of the diphenylene may be replaced with $C_{1-6}$ alkyl group.

According to embodiments of the disclosure, the bismaleimide may be N,N'-bismaleimide-4,4'-diphenylmethane, 1,1'-(methylenedi-4,1-phenylene)bismaleimide, N,N'-(1,1'-biphenyl-4,4'-diyl)bismaleimide, N,N'-(4-methyl-1,3-phenylene)bismaleimide, 1,1'-(3,3'dimethyl-1,1'-biphenyl-4,4'-diyl)bismaleimide, N,N'-ethylenedimaleimide, N,N'-(1,2-phenylene)dimaleimide, N,N'-(1,3-phenylene)dimaleimide, N,N'-thiodimaleimide, N,N'-dithiodimaleimide, N,N'-ketonedimaleimide, N,N'-methylene-bis-maleimide, bis-maleinimidomethyl-ether, 1,2-bis-(maleimido)-1,2-ethandiol, N,N'-4,4'-diphenylether-bis-maleimid, 4,4'-bis(maleimido)-diphenylsulfone, or a combination thereof.

According to embodiments of the disclosure, in the thin film composition, the copolymer may be uniformyl dispersed in the cross-linking agent. According to embodiments of the disclosure, in the thin film composition, the copolymer may be uniformyl dispersed in the resin. According to embodiments of the disclosure, in the thin film composition, the copolymer may be uniformyl dispersed in the cross-linking agent and resin. As a result, the thin film composition of the disclosure does not include solvent.

According to embodiments of the disclosure, the thin film composition of the disclosure may further include a solvent, in order to dissolve the copolymer, resin, or cross-linking agent. Therefore, the copolymer and the cross-linking agent may be uniformyl dispersed in the solvent.

According to embodiments of the disclosure, the solid content of the thin film composition is not limited and may be optionally modified according to the applications by a person of ordinary skill in the field. According to embodiments of the disclosure, the solid content of the thin film composition may be about 10 wt % to 100 wt % (such as about 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or 95 wt %). Herein, the solid content means the weight percentage of all components of the thin film composition except solvent, based on the weight of the thin film composition.

According to embodiments of the disclosure, the solvent may be aromatic hydrocarbon solvent, alcohol solvent, ether solvent, ketone solvent, ester solvent, nitrogen-containing solvent, or a combination thereof.

According to embodiments of the disclosure, the solvent may be benzene, toluene, xylene, ethylbenzene, diethylbenzene, trimethylbenzene, triethylbenzene, cyclohexane, cyclohexene, decahydronaphthalene, dipentene, pentane, hexane, heptane, octane, nonane, decane, ethyl cyclohexane, methyl cyclohexane, cyclohexane, cyclohexene, p-menthane, dipropyl ether, dibutyl ether, anisole, butyl acetate, entyl acetate, methyl isobutyl ketone (MEK), cyclohexylbenzene, cyclohexanone, cyclopentanone (CPN), triglyme, 1,3-dimethyl-2-imidazolidinone (DMI), N-methyl-2-pyrrolidone (NMP), methyl ethyl ketone (MEK), N,N-dimethyl acetamide (DMAc), γ-butyrolactone (GBL), N,N-dimethylformamide (DMF), propylene glycol methyl ether acetate (PGMEA), dimethyl sulfoxide (DMSO), or a combination thereof.

According to embodiments of the disclosure, the thin film composition can further include an initiator. According to embodiments of the disclosure, the amount of the additive is not limited and may be optionally modified by a person of ordinary skill in the field. The amount of the additive may be about 0.1 wt % to 10 wt % (such as about 0.2 wt %, 0.5 wt %, 0.8 wt %, 1 wt %, 1.5 wt %, 2 wt %, 2.5 wt %, 3 wt %, 4 wt %, 5 wt %, 6 wt %, 7 wt %, 8 wt %, or 9 wt %), based on the total weight of the copolymer and cross-linking agent, based on the total weight of the copolymer and resin, or based on the total weight of the copolymer, cross-linking agent, and resin.

According to embodiments of the disclosure, the thin film composition further includes an additive, wherein the additive may be leveling agent, filler, colorant, defoamer, flame retardant, or a combination thereof. According to embodiments of the disclosure, the amount of the additive is not limited and may be optionally modified by a person of ordinary skill in the field. The amount of the additive may be about 1 wt % to 100 wt % (such as about 2 wt %, 5 wt %, 8 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or 95 wt %), based on the total weight of the copolymer and cross-linking agent, based on the total weight of the copolymer and resin, or based on the total weight of the copolymer, cross-linking agent, and resin.

According to embodiments of the disclosure, the disclosure also provides a composite material. The composite material can include a cured product or semi-cured product prepared from the aforementioned thin film composition; and a substrate, wherein the cured product or semi-cured product is disposed on the substrate or disposed within the substrate. According to embodiments of the disclosure, the substrate may be glass fiber or copper foil. For example, the composite material can include prepreg, and the method for preparing the prepreg includes impregnating a glass fiber (serving as substrate) into the aforementioned thin film composition. Next, the composition is subjected to a semi-curing process, obtaining the prepreg. In addition, the composite material may further include a copper foil, and the composite material may be copper foil substrate, printed circuit board, or integrated circuit carrier.

According to embodiments of the disclosure, the thin film composition of the disclosure substantially consists of the copolymer of the disclosure and cross-linking agent. Namely, the copolymer and cross-linking agent are the main ingredients of the film composition. According to embodiments of the disclosure, the thin film composition of the disclosure substantially consists of the copolymer of the disclosure and resin. Namely, the copolymer and resin are the main ingredients of the film composition. According to embodiments of the disclosure, the thin film composition of the disclosure substantially consists of the copolymer of the disclosure, cross-linking agent and resin. Namely, the copolymer, cross-linking agent and resin are the main ingredients of the film composition. According to embodiments of the disclosure, the thin film composition can include other ingredients, the other ingredients may be solvent, initiator, additive, or a combination thereof.

Below, exemplary embodiments will be described in detail so as to be easily realized by a person having ordinary knowledge in the art. The inventive concept may be embodied in various forms without being limited to the exemplary embodiments set forth herein.

EXAMPLES

Preparation of Copolymer

Example 1

[1,3-bis(2,4,6-trimethylphenyl)-2-imidazolidinylidene] dichloro(phenylmethylene)(tricyclohexylphosphine) ruthenium (serving as metal catalyst) was added into a first reaction bottle under nitrogen atmosphere, and toluene was added into the first reaction bottle. After the metal catalyst was completely dissolved in toluene, a metal-catalyst-containing solution (with a solid content of 5 wt %) was obtained. Dicyclopentadiene (DCPD), norbornene (NB), cyclopentene (CPE) and 1-hexene were added into a second reaction bottle, wherein the molar ratio of dicyclopentadiene (DCPD), norbornene (NB) and cyclopentene (CPE) was 30:35:35. 1-Hexene had a molar percentage of 10 mol %, based on the total moles of dicyclopentadiene, norbornene and cyclopentene. Next, the metal-catalyst-containing solution was added into the second reaction bottle, wherein the amount of metal catalyst was 0.09 wt %, based on the total weight of dicyclopentadiene, norbornene and cyclopentene. After the reaction was complete at room temperature, appropriate amount of ethyl vinyl ether was added into the second reaction bottle to terminate the reaction. After overnight stirring, the catalyst of the obtained solution was removed and the result was subjected to a reprecipitation in methanol. After concentration and drying, Copolymer (I) was obtained. The solubility of Copolymer (I) in toluene was determined, and the weight percentage of Copolymer (I) dissolved in toluene was greater than or equal to 70 wt %. The solubility of the copolymer in toluene was measured by the following steps. The copolymer was added into toluene at room temperature (wherein the weight ratio of the copolymer to toluene was 1:1). After stirring the mixture for 10 minutes and standing for 1 hour, the weight of undissolved copolymer was determined so that the weight percentage (wt %) of Copolymer (I) dissolved in toluene was measured.

Example 2

Example 2 was performed in the same manner as in Example 1, except that the molar ratio of dicyclopentadiene, norbornene and cyclopentane was adjusted from 30:35:35 to 35:30:35, obtaining Copolymer (II). The solubility of Copolymer (II) in toluene was determined, and the weight percentage of Copolymer (II) dissolved in toluene was greater than or equal to 20 wt %.

Example 3

Example 3 was performed in the same manner as in Example 1, except that the molar ratio of dicyclopentadiene, norbornene and cyclopentane was adjusted from 30:35:35 to 35:35:30, the amount of the metal catalyst was 0.045 wt % and 1-hexene was not added, obtaining Copolymer (III). The solubility of Copolymer (III) in toluene was determined, and the weight percentage of Copolymer (III) dissolved in toluene was greater than or equal to 5 wt %.

Example 4

Example 4 was performed in the same manner as in Example 1, except that the molar ratio of dicyclopentadiene, norbornene and cyclopentane was adjusted from 30:35:35 to 50:25:25, obtaining Copolymer (IV). The solubility of Copolymer (IV) in toluene was determined, and the weight percentage of Copolymer (IV) dissolved in toluene was greater than or equal to 70 wt %.

Example 5

Example 5 was performed in the same manner as in Example 1, except that the molar ratio of dicyclopentadiene, norbornene and cyclopentane was adjusted from 30:35:35 to 35:53:12, obtaining Copolymer (V). The solubility of Copolymer (V) in toluene was determined, and the weight percentage of Copolymer (V) dissolved in toluene was greater than or equal to 70 wt %.

Example 6

Example 6 was performed in the same manner as in Example 1, except that the molar ratio of dicyclopentadiene, norbornene and cyclopentane was adjusted from 30:35:35 to 25:50:25 and the molar percentage of 1-hexene was 50 mol %, obtaining Copolymer (VI). The solubility of Copolymer (VI) in toluene was determined, and the weight percentage of Copolymer (VI) dissolved in toluene was greater than or equal to 5 wt %.

Example 7

Example 7 was performed in the same manner as in Example 1, except that the molar ratio of dicyclopentadiene, norbornene and cyclopentane was adjusted from 30:35:35 to 25:25:50, obtaining Copolymer (VII). The solubility of Copolymer (VII) in toluene was determined, and the weight percentage of Copolymer (VII) dissolved in toluene was greater than or equal to 70 wt %.

Example 8

Example 8 was performed in the same manner as in Example 1, except that the molar ratio of dicyclopentadiene, norbornene and cyclopentane was adjusted from 30:35:35 to 70:15:15, obtaining Copolymer (VIII). The solubility of Copolymer (VIII) in toluene was determined, and the weight percentage of Copolymer (VIII) dissolved in toluene was greater than or equal to 50 wt %.

Example 9

Example 9 was performed in the same manner as in Example 1, except that the molar ratio of dicyclopentadiene, norbornene and cyclopentane was adjusted from 30:35:35 to 15:70:15, obtaining Copolymer (IX). The solubility of Copolymer (IX) in toluene was determined, and the weight percentage of Copolymer (IX) dissolved in toluene was greater than or equal to 10 wt %.

Example 10

Example 10 was performed in the same manner as in Example 1, except that the molar ratio of dicyclopentadiene, norbornene and cyclopentane was adjusted from 30:35:35 to 15:15:70, the amount of the metal catalyst was 0.045 wt % and 1-hexene was not added, obtaining Copolymer (X). The solubility of Copolymer (X) in toluene was determined, and the weight percentage of Copolymer (X) dissolved in toluene was greater than or equal to 70 wt %.

Example 11

Example 11 was performed in the same manner as in Example 1, except that the molar ratio of dicyclopentadiene, norbornene and cyclopentane was adjusted from 30:35:35 to 99:0.5:0.5 and the molar percentage of 1-hexene was 30 mol %, obtaining Copolymer (XI). The solubility of Copolymer (XI) in toluene was determined, and the weight percentage of Copolymer (XI) dissolved in toluene was greater than or equal to 70 wt %.

Example 12

Example 12 was performed in the same manner as in Example 1, except that the molar ratio of dicyclopentadiene, norbornene and cyclopentane was adjusted from 30:35:35 to 0.5:99:0.5 and the amount of the metal catalyst was 0.045 wt %, obtaining Copolymer (XII). The solubility of Copolymer (XII) in toluene was determined, and the weight percentage of Copolymer (XII) dissolved in toluene was greater than or equal to 50 wt %.

Example 13

Example 13 was performed in the same manner as in Example 12, except that the molar percentage of 1-hexene was 1 mol %, obtaining Copolymer (XIII), the weight percentage of Copolymer (XIII) dissolved in toluene was equal to about 3 wt % to 5 wt %.

Example 14

Example 14 was performed in the same manner as in Example 12, except that 1-hexene was not added, obtaining Copolymer (XIV), the weight percentage of Copolymer (XIV) dissolved in toluene was about 3 wt % to 5 wt %.

Example 15

Example 15 was performed in the same manner as in Example 1, except that the molar ratio of dicyclopentadiene, norbornene and cyclopentane was adjusted from 30:35:35 to 0.5:0.5:99, the amount of the metal catalyst was 0.022 wt % and the molar percentage of 1-hexene was 5 mol %, obtaining Copolymer (XV). The solubility of Copolymer (XV) in toluene was determined, and the weight percentage of Copolymer (XV) dissolved in toluene was greater than or equal to 70 wt %.

Example 16

Example 16 was performed in the same manner as in Example 15, except that the amount of the metal catalyst was 0.011 wt %, obtaining Copolymer (XVI). The solubility of Copolymer (XVI) in toluene was determined and the weight percentage of Copolymer (XVI) dissolved in toluene was greater than or equal to 80 wt %.

Example 17

Example 17 was performed in the same manner as in Example 15, except that 1-hexene was not added, obtaining Copolymer (XVII).

The number average molecular weight, polydispersity index (PDI), and exothermic amount in the specific range of Copolymer (I)-(XVII) were determined, and the results are shown in Table 1. The number average molecular weight was determined by gel permeation chromatography (GPC) (available under the trade designation of RI Model 2414), and the polydispersity index was determined by refractive index detector (commercially available from RI Detector available under the trade designation of Jasco PU2089) (determined by gel permeation chromatography (GPC) based on a polystyrene (with known weight average molecular weight (Mw)) calibration curve). The solubility of the copolymer in toluene was measured by the following steps. The copolymer was added into toluene at room temperature (wherein the weight ratio of the copolymer to toluene was 1:1). After stirring the mixture for 10 minutes and standing for 1 hour, the weight of undissolved copolymer was determined so that the weight percentage (wt %) of Copolymer (I) dissolved in toluene was measured. The exothermic amount of copolymer in the range from 40° C. to 280° C. was determined by differential scanning calorimetry (DSC) with a differential scanning calorimeter (commercially available from TA Instruments under the trade designation of Q2000) with a heating rate of 20° C./minutes.

Comparative Example 1

[1,3-bis(2,4,6-trimethylphenyl)-2-imidazolidinylidene] dichloro(phenylmethylene)(tricyclohexylphosphine) ruthenium (serving as metal catalyst) was added into a first reaction bottle under nitrogen atmosphere, and toluene was added into the first reaction bottle. After the metal catalyst was completely dissolved in toluene, a metal-catalyst-containing solution (with a solid content of 5 wt %) was obtained. Norbornene (NB), cyclopentene (CPE) and 1-hexene were added into a second reaction bottle, wherein the molar ratio of norbornene (NB) and cyclopentene (CPE) was 50:50. 1-Hexene had a molar percentage of 5 mol %, based on the total moles of norbornene and cyclopentene. Next, the metal-catalyst-containing solution was added into the second reaction bottle, wherein the amount of metal catalyst was 0.01 wt %, based on the total weight of norbornene and cyclopentene. After the reaction was complete at room temperature, appropriate amount of ethyl vinyl ether was added into the second reaction bottle to terminate the reaction. After overnight stirring, the catalyst of the obtained solution was removed and the result was subjected to a reprecipitation in methanol. After concentration and drying, Copolymer (XVIII) was obtained. The solubility of Copolymer (XVIII) in toluene was determined, and the weight percentage of Copolymer (XVIII) dissolved in toluene was greater than or equal to 20 wt %.

Comparative Example 2

[1,3-bis(2,4,6-trimethylphenyl)-2-imidazolidinylidene] dichloro(phenylmethylene)(tricyclohexylphosphine) ruthenium (serving as metal catalyst) was added into a first reaction bottle under nitrogen atmosphere, and toluene was added into the first reaction bottle. After the metal catalyst was completely dissolved in toluene, a metal-catalyst-containing solution (with a solid content of 5 wt %) was obtained. Dicyclopentadiene (DCPD), cyclopentene (CPE) and 1-hexene were added into a second reaction bottle, wherein the molar ratio of dicyclopentadiene (DCPD) and cyclopentene (CPE) was 50:50. 1-Hexene had a molar percentage of 30 mol %, based on the total moles of dicyclopentadiene and cyclopentene. Next, the metal-catalyst-containing solution was added into the second reaction bottle, wherein the amount of metal catalyst was 0.01 wt %, based on the total weight of dicyclopentadiene and cyclopentene. After the reaction was complete at room temperature, appropriate amount of ethyl vinyl ether was added into the second reaction bottle to terminate the reaction. After overnight stirring, the catalyst of the obtained solution was removed and the result was subjected to a reprecipitation in methanol. After concentration and drying, Copolymer (XIX) was obtained. The solubility of Copolymer (XIX) in toluene was determined, and the weight percentage of Copolymer (XIX) dissolved in toluene was greater than or equal to 70 wt %.

Comparative Example 3

[1,3-bis(2,4,6-trimethylphenyl)-2-imidazolidinylidene] dichloro(phenylmethylene)(tricyclohexylphosphine) ruthenium (serving as metal catalyst) was added into a first reaction bottle under nitrogen atmosphere, and toluene was added into the first reaction bottle. After the metal catalyst was completely dissolved in toluene, a metal-catalyst-containing solution (with a solid content of 5 wt %) was obtained. Dicyclopentadiene (DCPD), norbornene (NB) and 1-hexene were added into a second reaction bottle, wherein the molar ratio of dicyclopentadiene (DCPD) and norbornene (NB) was 20:80. 1-Hexene had a molar percentage of 50 mol %, based on the total moles of dicyclopentadiene and cyclopentene. Next, the metal-catalyst-containing solution was added into the second reaction bottle, wherein the amount of metal catalyst was 0.05 wt %, based on the total weight of dicyclopentadiene and norbornene. After the reaction was complete at room temperature, appropriate amount of ethyl vinyl ether was added into the second reaction bottle to terminate the reaction. After overnight stirring, the catalyst of the obtained solution was removed and the result was subjected to a reprecipitation in methanol. After concentration and dry, Copolymer (XX) was obtained. The solubility of Copolymer (XX) in toluene was determined, and the weight percentage of Copolymer (XX) dissolved in toluene was greater than or equal to 70 wt %.

The number average molecular weight, polydispersity index (PDI), and exothermic amount in the specific range Copolymer (XVIII)-(XX) were determined, and the results are shown in Table 1.

TABLE 1

| | monomer ratio (DCPD:NB:CPE) | number average molecular weight (Mn) | polydispersity index (PDI) | exothermic amount (J/g) (in the range from 40° C. to 280° C.) |
|---|---|---|---|---|
| Example 1 (Copolymer (I)) | 30:35:35 | 1240 | 2.26 | 224 |
| Example 2 (Copolymer (II)) | 35:30:35 | 4147 | 1.40 | 327 |
| Example 3 (Copolymer (III)) | 35:35:30 | 6452 | 1.37 | 315 |
| Example 4 (Copolymer (IV)) | 50:25:25 | 2561 | 1.87 | 104 |
| Example 5 (Copolymer (V)) | 35:53:12 | 1722 | 1.46 | 112 |
| Example 6 (Copolymer (VI)) | 25:50:25 | 7560 | 1.55 | 163 |
| Example 7 (Copolymer (VII)) | 25:25:50 | 2058 | 1.96 | 163 |
| Example 8 (Copolymer (VIII)) | 70:15:15 | 3614 | 1.36 | 218 |
| Example 9 (Copolymer (IX)) | 15:70:15 | 5288 | 1.74 | 185 |
| Example 10 (Copolymer (X)) | 15:15:70 | 1861 | 1.80 | 366 |
| Example 11 (Copolymer (XI)) | 99:0.5:0.5 | 1692 | 1.72 | 207 |
| Example 12 (Copolymer (XII)) | 0.5:99:0.5 | 2751 | 2.29 | 139 |
| Example 13 (Copolymer (XIII)) | 0.5:99:0.5 | 19388 | 2.27 | 101 |
| Example 14 (Copolymer (XIV)) | 0.5:99:0.5 | 40887 | 3.48 | 147 |
| Example 15 (Copolymer (XV)) | 0.5:0.5:99 | 1766 | 1.98 | 277 |
| Example 16 (Copolymer (XVI)) | 0.5:0.5:99 | 649 | 1.06 | 647 |
| Example 17 (Copolymer (XVII)) | 0.5:0.5:99 | 82702 | 2.20 | 212 |
| Comparative Example 1 (Copolymer (XVIII)) | 0:50:50 | 4070 | 2.20 | 98 |
| Comparative Example 2 (Copolymer (XIX)) | 50:0:50 | 2027 | 1.29 | 65 |
| Comparative Example 3 (Copolymer (XX)) | 20:80:0 | 1159 | 1.45 | 45 |

As shown in Table 1, the exothermic amounts of the copolymers of the disclosure in the range from 40° C. to 280° C. are all greater than or equal to 100 J/g. It means that the copolymer of the disclosure exhibits excellent reactivity. Therefore, the copolymer of the disclosure can be further blended with various resins or cross-linking agents to prepare the thin film composition. In addition, as shown in Table 1, when the number average molecular weight (Mn) of the copolymer of the disclosure is between about 500 (g/mol) and 100,000 (g/mol), the copolymer is soluble in toluene. Therefore, the thin film composition including these copolymers is suitable for use in a process for preparing the prepreg. Furthermore, as shown in Table 1, the exothermic amounts in the range from 40° C. to 280° C. of those copolymers which were not prepared by reacting monomers simultaneously including dicyclopentadiene, norbornene and cyclopentane to undergo copolymerization (i.e. the copolymers of Comparative Examples 1-3) are less than 100 J/g, thereby reducing their reactivity.

Example 18

Example 18 was performed in the same manner as in Example 9, except that norbornene was replaced with 5-vinyl-2-norbornene (VNB), obtaining Copolymer (XXI). The solubility in toluene of Copolymer (XXI) was determined, and the weight percentage of Copolymer (XXI) dissolved in toluene was greater than or equal to 70 wt %.

Example 19

Example 19 was performed in the same manner as in Example 9, except that norbornene was replaced with 5-vinyl-2-norbornene (VNB), obtaining Copolymer (XXII). The solubility in toluene of Copolymer (XXII) was determined, and the weight percentage of Copolymer (XXII) dissolved in toluene was greater than or equal to 50 wt %.

TABLE 2

| | monomer ratio (DCPD:VNB:CPE) | number average molecular weight (Mn) | polydispersity index (PDI) | exothermic amount (J/g) (in the range from 40° C. to 280° C.) |
|---|---|---|---|---|
| Example 18 (copolymer (XXI)) | 15:70:15 | 1170 | 1.47 | 414 |
| Example 19 (copolymer (XXII)) | 15:70:15 | 3276 | 1.87 | 127 J/g |

As shown in Table 2, the exothermic amounts of the copolymers of the disclosure in the range from 40° C. to 280° C. are all greater than or equal to 120 J/g. It means that the copolymer of the disclosure exhibits excellent reactivity.

Property Test of Thin Film Composition and Cured Product Thereof

Example 20

Copolymer (I) of Example 1 (42 parts by weight), polystyrene-butadiene-styrene (SBS) (commercially available from Cray Valley under the trade designation of Ricon100, with a molecular weight of 4,500) (42 parts by weight), and polyphenylene ether (PPE) (commercially available from SABIC under the trade designation of SA9000, with a molecular weight of 2,300) (16 parts by weight), and initiator (with a trade number of Luperox®101) (1 part by weight) were dissolved in toluene, obtaining Thin film composition (I) after uniformyl stirring.

Next, Thin film composition (I) was coated on a metal copper foil (commercially available from Furukawa copper foil). Next, the result was heated at 100° C. under nitrogen atmosphere. After a period of time, the result was heated gradually to a temperature less than 230° C. to undergo a cross-linking reaction (in order to achieve the best cross-linking density), obtaining Thin film (I). Next, the dielectric constant (Dk) and dissipation factor (Df) of Thin film (I) were analyzed, and the results are shown in Table 3. The dielectric constant (Dk) and the dissipation factor (Df) are measured by microwave dielectrometer (commercially available from AET) at 10 GHz and 40 GHz.

Examples 21-38

Examples 21-38 were performed in the same manner as in Example 20, except that Copolymer (I) was replaced with Copolymers (II)-(XVII), (XXI) and (XXII) individually, obtaining Thin films (II)-(XIX). Next, the dielectric constant (Dk) and dissipation factor (Df) of Thin films (II)-(XIX) were analyzed, and the results are shown in Table 3.

Comparative Examples 4-6

Comparative Examples 4-6 were performed in the same manner as in Example 20, except that Copolymer (I) was replaced with Copolymers (XVIII)-(XX) individually and the temperature for the cross-linking reaction was raised to 250° C. to undergo a cross-linking reaction, obtaining Thin films (XX)-(XXII). Next, the dielectric constant (Dk) and dissipation factor (Df) of Thin films (XX)-(XXII) were analyzed, and the results are shown in Table 3.

TABLE 3

| | film formation temperature | 10 GHz | | 40 GHz | |
|---|---|---|---|---|---|
| | | dielectric constant (Dk) | dissipation factor (Df) | dielectric constant (Dk) | dissipation factor (Df) |
| Example 20 (Thin film (I)) | 230° C. | 2.53 | 0.0019 | 2.49 | 0.0025 |
| Example 21 (Thin film (II)) | 230° C. | 2.52 | 0.0019 | 2.50 | 0.0024 |
| Example 22 (Thin film (III)) | 230° C. | 2.34 | 0.0018 | 2.47 | 0.0021 |
| Example 23 (Thin film (IV)) | 230° C. | 2.43 | 0.0023 | 2.47 | 0.0025 |
| Example 24 (Thin film (V)) | 230° C. | 2.43 | 0.0019 | 2.38 | 0.0022 |
| Example 25 (Thin film (VI)) | 230° C. | 2.47 | 0.0016 | 2.46 | 0.0018 |
| Example 26 (Thin film (VII)) | 230° C. | 2.39 | 0.0022 | 2.43 | 0.0025 |
| Example 27 (Thin film (VIII)) | 230° C. | 2.55 | 0.0019 | 2.40 | 0.0024 |
| Example 28 (Thin film (IX)) | 230° C. | 2.34 | 0.0018 | 2.37 | 0.0022 |
| Example 29 (Thin film (X)) | 230° C. | 2.41 | 0.0019 | 2.43 | 0.0025 |
| Example 30 (Thin film (XI)) | 230° C. | 2.52 | 0.0016 | 2.48 | 0.0017 |
| Example 31 (Thin film (XII)) | 230° C. | 2.46 | 0.0014 | 2.46 | 0.0017 |
| Example 32 (Thin film (XIII)) | 230° C. | 2.49 | 0.0015 | 2.18 | 0.0014 |
| Example 33 (Thin film (XIV)) | 230° C. | 2.38 | 0.0014 | 2.29 | 0.0015 |
| Example 34 (Thin film (XV)) | 230° C. | 2.44 | 0.0019 | 2.42 | 0.0023 |
| Example 35 (Thin film (XVI)) | 230° C. | 2.36 | 0.0019 | 2.33 | 0.0022 |
| Example 36 (Thin film (XVII)) | 230° C. | 2.59 | 0.0026 | 2.48 | 0.0030 |
| Example 37 (Thin film (XVIII)) | 230° C. | 2.47 | 0.0020 | 2.48 | 0.0024 |

TABLE 3-continued

|  | film formation temperature | 10 GHz | | 40 GHz | |
|---|---|---|---|---|---|
|  |  | dielectric constant (Dk) | dissipation factor (Df) | dielectric constant (Dk) | dissipation factor (Df) |
| Example 38 (Thin film (XIX)) | 230° C. | 2.51 | 0.0016 | 2.46 | 0.0018 |
| Comparative Example 4(Thin film (XX)) | 250° C. | 2.47 | 0.0032 | 2.46 | 0.0026 |
| Comparative Example 5(Thin film (XXI)) | 250° C. | 2.54 | 0.0032 | 2.59 | 0.0029 |
| Comparative Example 6(Thin film (XXII)) | 250° C. | 2.53 | 0.0033 | 2.49 | 0.0038 |

As shown in Table 3, since the thin film composition of the disclosure (such as Examples 20-38) includes the copolymer prepared from the specific monomers of the disclosure, the cured product (such as thin film) exhibits low dielectric constant (Dk) (less than or equal to 2.59 (at 10 GHz)) and low dissipation factor (Df) (less than or equal to 0.0026 (at 10 GHz)), thereby being suitable as high frequency substrate material. As shown in the aforementioned Examples, the composition of the disclosure may undergo a cross-linking reaction at a temperature less than 250° C., thereby achieving great cross-linking density (the best cross-linking density was determined via the exothermic amount measured by differential scanning calorimetry). In addition, as shown in Comparative Examples 4-6, since the thin film compositions of Comparative Examples 4-6 did not include the copolymer of the disclosure, the cross-linking reaction should be performed at a relatively high cross-linking temperature (such as 250° C.) (due to the poor reactivity of the copolymer), and the cured product (such as thin film) exhibits high dielectric constant (Dk) and high dissipation factor (Df).

Example 39

Copolymer (VII) of Example 7 (10 parts by weight), and polyphenylene ether (PPE) (commercially available from SABIC under the trade designation of SA9000, with a molecular weight of 2,300) (90 parts by weight), and initiator (with a trade number of Luperox®101) (1 part by weight) were dissolved in toluene, obtaining Thin film composition (XXIII).

Next, the thin film composition (XXIII) was coated on a metal copper foil (commercially available from Furukawa copper foil). Next, the result was heated at 100° C. under nitrogen atmosphere. After a period of time, the result was heated gradually to a temperature less than 230° C. to undergo a cross-linking reaction (in order to achieve the best cross-linking density), obtaining Thin film (XXIII). Next, the dielectric constant (Dk) and dissipation factor (Df) of Thin film (XXIII) were analyzed, and the results are shown in Table 4.

Example 40

Copolymer (XIV) of Example 14 (50 parts by weight), divinylbenzene (50 parts by weight), and initiator (with a trade number of Luperox®101) (1 part by weight) were dissolved in toluene, obtaining Thin film composition (XXIV).

Next, Thin film composition (XXIV) was coated on a metal copper foil (commercially available from Furukawa copper foil). Next, the result was heated at 100° C. under nitrogen atmosphere. After a period of time, the result was heated gradually to a temperature less than 230° C. to undergo a cross-linking reaction (in order to achieve the best cross-linking density), obtaining Thin film (XXIV). Next, the dielectric constant (Dk) and dissipation factor (Df) of Thin film (XXIV) were analyzed, and the results are shown in Table 4.

Example 41

Copolymer (XII) of Example 12 (40 parts by weight), polystyrene-butadiene-styrene (SBS) (commercially available from Cray Valley under the trade designation of Ricon100, with a molecular weight of 4,500) (20 parts by weight), polyphenylene ether (PPE) (commercially available from SABIC under the trade designation of SA9000, with a molecular weight of 2,300) (20 parts by weight), triallyl isocyanurate (TAIC) (20 parts by weight), and initiator (with a trade number of Luperox®101) (1 part by weight) were dissolved in toluene, obtaining Thin film composition (XXV).

Next, Thin film composition (XXV) was coated on a metal copper foil (commercially available from Furukawa copper foil). Next, the result was heated at 100° C. under nitrogen atmosphere. After a period of time, the result was heated gradually to a temperature less than 230° C. to undergo a cross-linking reaction (in order to achieve the best cross-linking density), obtaining Thin film (XXV). Next, the dielectric constant (Dk) and dissipation factor (Df) of Thin film (XXV) were analyzed, and the results are shown in Table 4.

TABLE 4

| | | 10 GHz | | 40 GHz | |
|---|---|---|---|---|---|
| | film formation temperature | dielectric constant (Dk) | dissipation factor (Df) | dielectric constant (Dk) | dissipation factor (Df) |
| Example 39 (Thin film (XXIII)) | 230° C. | 2.46 | 0.0023 | 2.50 | 0.0032 |
| Example 40 (Thin film (XXIV)) | 230° C. | 2.60 | 0.0025 | 2.59 | 0.0026 |
| Example 41 (Thin film (XXV)) | 230° C. | 2.42 | 0.0019 | 2.40 | 0.0020 |

As shown in Table 4, since the thin film compositions of the disclosure (such as Examples 39 and 40) includes the copolymer prepared from the specific monomers of the disclosure, the cured product (such as thin film) exhibits low dielectric constant (Dk) (less than or equal to 2.60 (at 10 GHz)) and low dissipation factor (Df) (less than or equal to 0.0025 (at 10 GHz)), thereby being suitable as high frequency substrate material. In addition, as shown in Example 41, the cured product (such as thin film) of the thin film composition of the disclosure, which simultaneously includes copolymer, resin and cross-linking agent, exhibits low dielectric constant (Dk) and low dissipation factor (Df), thereby being suitable as high frequency substrate material.

It will be clear that various modifications and variations may be made to the disclosed methods and materials. It is intended that the specification and examples be considered as exemplary only, with the true scope of the disclosure being indicated by the following claims and their equivalents.

What is claimed is:

1. A copolymer, which is a copolymerization product of a composition, wherein the composition comprises a monomer (a), a monomer (b) a monomer (c), and an alpha-olefin, wherein the monomer (a) is a compound having a structure of Formula (I), the monomer (b) is a compound having a structure of Formula (II), and the monomer (c) is a compound having a structure of Formula (III)

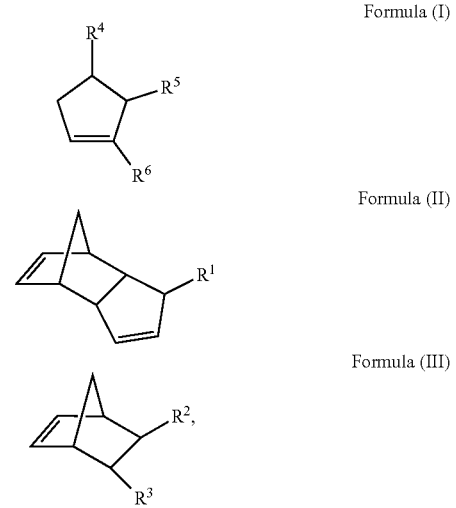

Formula (I)

Formula (II)

Formula (III)

wherein $R^1$ is hydrogen, chlorine, fluorine, hydroxyl group, cyano group, amino group, $C_{1-6}$ alkyl group, $C_{1-6}$ fluoroalkyl group, $C_{1-6}$ alkoxy group, $C_{1-6}$ alkylamino group, $C_{1-6}$ aminoalkyl group, thiol group, $C_{1-6}$ alkylthio group, $C_{1-6}$ thioalkyl group, $C_{1-6}$ alkylsulfonyl group, $C_{1-6}$ alkoxysulfonyl group, $C_{2-6}$ alkanoyl group, $C_{2-6}$ alkanoyloxy group, $C_{2-6}$ alkoxycarbonyl group, or $C_{6-12}$ aryl group; $R^2$ and $R^3$ are independently hydrogen, chlorine, fluorine, hydroxyl group, formyl group, acrylate group, methacrylate group, cyano group, isocyanate group, amino group, $C_{1-6}$ alkyl group, $C_{4-8}$ cycloalkyl group, $C_{1-6}$ fluoroalkyl group, $C_{2-6}$ alkenyl group, $C_{5-8}$ cycloalkenyl group, $C_{2-6}$ alkynyl group, $C_{1-6}$ alkoxy group, $C_{1-6}$ alkylol group, $C_{2-6}$ alkoxyalkyl group, $C_{1-6}$ alkylamino group, $C_{1-6}$ aminoalkyl group, $C_{2-6}$ alkanoyl group, $C_{2-6}$ alkanoyloxy group, $C_{2-6}$ alkoxycarbonyl group, carbamoyl group, $C_{2-7}$ alkylcarbamoyl group, $C_{1-9}$ silyl group, $C_{1-9}$ siloxy group, or $C_{6-12}$ aryl group; $R^4$ is hydrogen, chlorine, fluorine hydroxyl group, $C_{1-6}$ alkyl group, $C_{1-6}$ fluoroalkyl group, $C_{2-6}$ alkenyl group, $C_{1-6}$ alkylamino group, $C_{1-6}$ aminoalkyl group, carbamoyl group, or $C_{2-7}$ alkylcarbamoyl group; $R^5$ is hydrogen, chlorine, fluorine, hydroxyl group, $C_{1-6}$ alkyl group, $C_{1-6}$ fluoroalkyl group, $C_{2-6}$ alkenyl group, $C_{1-6}$ alkylamino group, $C_{1-6}$ aminoalkyl group, carbamoyl group, $C_{2-7}$ alkylcarbamoyl group, $C_{2-6}$ alkanoyl group, $C_{2-6}$ alkanoyloxy group, $C_{2-6}$ alkoxycarbonyl group, $C_{1-9}$ silyl group, $C_{1-9}$ siloxy group, or $C_{6-12}$ aryl group; and, $R^6$ is hydrogen, chlorine, fluorine, cyano group, $C_{1-6}$ alkyl group, $C_{1-6}$ fluoroalkyl group, $C_{2-6}$ alkenyl group, $C_{1-6}$ alkylamino group, $C_{1-6}$ aminoalkyl group, carbamoyl group, $C_{2-7}$ alkylcarbamoyl group, $C_{2-6}$ alkanoyl group, $C_{2-6}$ alkanoyloxy group, $C_{2-6}$ alkoxycarbonyl group, $C_{1-9}$ silyl group, $C_{1-9}$ siloxy group, or $C_{6-12}$ aryl group, and wherein an amount of the alpha-olefin is 0.1 mol % to 80 mol %, based on the total mole of the monomer (a), monomer (b), and monomer (c).

2. The copolymer as claimed in claim 1, wherein a molar ratio of the monomer (a) to the monomer (b) and the monomer (c) is 0.5:99.5 to 99:1.

3. The copolymer as claimed in claim 1, wherein the molar ratio of the monomer (b) to the monomer (c) is 1:99 to 99:1.

4. The copolymer as claimed in claim 1, wherein a number average molecular weight of the copolymer is from 500 to 100,000.

5. The copolymer as claimed in claim 1, wherein the monomer (b) is norbornene, 5-vinyl-2-norbornene, 5-methylidene-2-norbornene, 5-ethylidene-2-norbornene, or a combination thereof.

6. The copolymer as claimed in claim 1, wherein the monomer (c) is cyclopentene, 1-methylcyclopentene, 3-methylcyclopentene, 1-chlorocyclopentene, 3-chlorocyclopentene, or a combination thereof.

7. A thin film composition, comprising:
the copolymer as claimed in claim 1; and
a cross-linking agent, a resin, or a combination thereof, wherein the weight ratio of the copolymer to the cross-linking agent is 9:1 to 3:7, when the thin film composition comprises the copolymer and the cross-linking agent; the weight ratio of the copolymer to the resin is 1:99 to 99:1, when the thin film composition comprises the copolymer and the resin; or the weight ratio of the copolymer to the cross-linking agent is 9:1 to 3:7 and the weight ratio of the copolymer to the resin is 1:99 to 99:1, when the thin film composition comprises the copolymer, the cross-linking agent, and the resin.

8. The thin film composition as claimed in claim 7, wherein the resin is polyolefin resin, epoxy resin, cyanate resin, phenol resin, novolac resin, polystyrene resin, styrene-butadiene copolymer resin, polyamide resin, polyimide resin, maleimide resin, bismaleimide resin, polyphenylene ether resin, or a combination thereof.

9. The thin film composition as claimed in claim 7, wherein the cross-linking agent is a compound having at least two crosslinkable functional groups, wherein the cross-linkable functional group is $C_{2-5}$ alkenyl group, methacrylate group, acrylate group, acryloyl group, methacryloyl group, carboxyl group, vinylbenzyl group, epoxypropyl group, epoxypropyl group, oxiranyl group, oxetanyl group, or 3,4-epoxycyclohexyl group.

10. A composite material, comprising:
a cured product or a semi-cured product of the thin film composition as claimed in claim 7; and
a substrate, wherein the cured product or the semi-cured product is disposed on the substrate or disposed within the substrate.

11. The composite material as claimed in claim 10, wherein the substrate is glass fiber or copper foil.

12. The composite material as claimed in claim 10, wherein the composite material is a copper foil substrate, printed circuit board, or integrated circuit carrier.

\* \* \* \* \*